United States Patent [19]

Van Broekhoven et al.

[11] Patent Number: 5,095,091

[45] Date of Patent: Mar. 10, 1992

[54] POLYMERIZATION OF CO/OLEFIN WITH TWO DISTINCT TEMPERATURES

[75] Inventors: Johannes A. M. Van Broekhoven; Leonardus Petrus; Barend Mastenbroek, all of Amsterdam; Coenraad H. Wilms, Klundert, all of Netherlands

[73] Assignee: Shell Oil Company, Houston, Tex.

[21] Appl. No.: 599,528

[22] Filed: Oct. 18, 1990

[30] Foreign Application Priority Data

Nov. 15, 1989 [NL] Netherlands ........................ 8902821

[51] Int. Cl.$^5$ ............................................ C08G 67/02
[52] U.S. Cl. .................................................... 528/392
[58] Field of Search ......................................... 528/392

[56] References Cited

U.S. PATENT DOCUMENTS

| | | | |
|---|---|---|---|
| 3,694,412 | 9/1972 | Nozaki | 260/63 |
| 4,786,714 | 11/1988 | Drent | 528/392 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |
| 4,965,341 | 10/1990 | Van Doorn et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 257663 | 3/1988 | European Pat. Off. . |
| 213671 | 3/1989 | European Pat. Off. . |
| 345847 | 12/1989 | European Pat. Off. . |

*Primary Examiner*—Harold D. Anderson

[57] ABSTRACT

An improved process for the production of linear alternating polymers of carbon monoxide and at least one ethylenically unsaturated hydrocarbon in the presence of a reaction diluent and a catalyst composition formed from a palladium compound, the anion of a strong non-hydrohalogenic acid and a bidentate ligand of phosphorus, nitrogen or sulfur comprises conducting a first polymerization to produce a prepolymer and completing the polymerization at a lower temperature in the presence of sufficient prepolymer to constitute a substantial proportion of the polymerization mixture.

10 Claims, No Drawings

POLYMERIZATION OF CO/OLEFIN WITH TWO DISTINCT TEMPERATURES

FIELD OF THE INVENTION

This invention relates to an improved process of producing linear alternating polymers of carbon monoxide and at least one ethylenically unsaturated hydrocarbon. More particularly, the invention relates to such a process of producing the linear alternating polymers of relatively high molecular weight at a relatively high reaction rate.

BACKGROUND OF THE INVENTION

The class of linear alternating polymers of carbon monoxide and at least one ethylenically unsaturated hydrocarbon is known in the art. An early production of such polymers was disclosed by Nozaki, e.g., U.S. Pat. No. 3,694,412. More recent procedures for the production of such polymers are disclosed by a number of published European Patent Applications including 121,965, 181,014, 213,671, 257,663 and 345,847. These latter references describe processes which employ catalyst compositions typically formed from a compound of palladium, the anion of a strong non-hydrohalogenic acid and a bidentate ligand of phosphorus, nitrogen or sulfur.

More recently, the linear alternating polymers have become of greater interest because of the greater availability of the polymers and the desirable properties they exhibit. The linear alternating polymers, now known as polyketones or polyketone polymers, have demonstrated utility as premium thermoplastics. They are processed by methods conventional for thermoplastic polymers, e.g., extrusion, injection molding and thermoforming, into a variety of shaped articles such as containers for food and drink.

Certain procedural difficulties are often encountered during the production of the polyketone polymers. It is generally desirable, of course, to produce polymer at a relatively rapid polymerization rate. On the other hand, it is often desirable to produce polymer of relatively high molecular weight because of the particularly desirable properties of such polymers, e.g., higher melting points and deformation temperatures. During a typical production of the linear alternating polymers, however, the polymerization rate and molecular weight often show an inverse relationship. Processes that proceed relatively rapidly will often produce polymer of relatively low molecular weight. It would be of advantage to provide a polymerization process for the production of polyketone polymers which produces polymer product of relatively high molecular weight at an acceptable polymerization rate.

SUMMARY OF THE INVENTION

The present invention provides an improved process for the production of linear alternating polymers of carbon monoxide and at least one ethylenically unsaturated hydrocarbon. More particularly, the present invention provides a process for the production of such polymers characterized by a relatively rapid polymerization rate and a product of relatively high molecular weight. The improved process comprises the production of polyketone polymer in the presence of a prepolymer produced at a higher reaction temperature.

DESCRIPTION OF THE INVENTION

The present invention contemplates the improved production of a linear alternating polymer of carbon monoxide and at least one ethylenically unsaturated hydrocarbon. The polymerization is conducted at a first polymerization temperature to produce an initial polymer or prepolymer. The polymerization is then continued at a lower reaction temperature in the presence of a substantial amount of the prepolymer.

The ethylenically unsaturated hydrocarbons which are useful as precursors of the linear alternating polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are produced according to the process of the invention, there will be at least about 2 units derived from ethylene for each unit derived from the second hydrocarbon. Preferably, there will be from about 10 units to about 100 units derived from ethylene for each unit derived from the second hydrocarbon. The polymer chain of the preferred polymers is therefore represented by the repeating formula

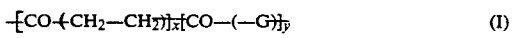 (I)

wherein G is the moiety of a second ethylenically unsaturated hydrocarbon of at least 3 carbon atoms polymerized through the ethylenic unsaturation thereof and the ratio of y:x is no more than about 0.5. When the preferred copolymers of carbon monoxide and ethylene are produced, there will be no second hydrocarbon present and the polymers are represented by the above formula I wherein y is zero. When y is other than zero, i.e., terpolymers are produced, the —CO—(CH$_2$CH$_2$)— units and the —CO—(G)— units occur randomly throughout the polymer chain and ratios of y:x from about 0.01 to about 0.1 are preferred. The end groups or "caps" of the polymer chain will depend upon what materials were present during the polymerization and whether or how the polymer was purified. The end groups are of little significance so far as the overall properties of the polymer are concerned, however, so that the polymer is fairly represented by the polymer chain as depicted above.

Of particular interest are the polyketone polymers of the above formula I having a number average molecular weight from about 1000 to about 200,000, especially those of number average molecular weight from about 20,000 to about 90,000, as determined by gel permeation chromatography. The physical properties of such polymers will be determined in part by the molecular weight, whether the polymer is a copolymer or a terpolymer, and in the case of the terpolymers the nature of and the proportion of the second hydrocarbon present. Typical melting points are from about 175° C. to about 300° C., more often from about 210° C. to about 270° C. The polymers will have a limiting viscosity number (LVN), measured in a standard capillary viscosity measuring device in m-cresol at 60° C., of from about 0.8 dl/g to about 4 dl/g, preferably from about 1.5 dl/g to about 3 dl/g.

The process of the invention employs a catalyst composition as is generally described by the above published European Patent Applications. Although the scope of the polymerization catalysts is extensive, a preferred catalyst composition is formed from a compound of palladium, the anion of a non-hydrohalogenic acid having a pKa (measured in water at 18° C.) below 2 and a bidentate ligand of phosphorus, nitrogen or sulfur. The compound of palladium is a palladium salt and is preferably a palladium alkanoate such as palladium acetate, palladium propionate, palladium butyrate or palladium hexanoate. Palladium acetate is particularly preferred. The anion is the anion of an inorganic acid such as sulfuric acid or perchloric acid or is the anion of an organic acid including carboxylic acids such as trichloroacetic acid, dichloroacetic acid and trifluoroacetic acid as well as sulfonic acids such as methanesulfonic acid, trifluoromethanesulfonic acid and p-toluenesulfonic acid. In general, the anions of organic carboxylic acids are preferred and particularly preferred is the anion of trifluoroacetic acid. The anion is customarily provided in the form of the free acid but in alternate modifications the anion is provided as a metal salt, particularly as the salt of a non-noble transition metal, e.g., a copper or nickel salt, or even as a salt of the palladium precursor of the catalyst composition, e.g., palladium trifluoroacetate. Regardless of the form in which the anion is provided, sufficient anion is used to provide from about 1 mole to about 100 moles, preferably from about 2 moles to about 50 moles, of anion per mole of palladium.

The bidentate ligand employed to form the catalyst composition is a bidentate ligand of sulfur, nitrogen or phosphorus. When a bidentate ligand of sulfur is employed, the ligand is preferably of the formula $$R'—S—R—S—R' \qquad (II)$$

wherein R' independently is aliphatic or aromatic of up to 10 carbon atoms inclusive and R is a hydrocarbon divalent bridging group of up to 10 carbon atoms with from 2 to 4 carbon atoms in the bridge. Preferred among such R groups are 1,2-ethylene or 1,3-propylene. The R' group is hydrocarbon containing only atoms of carbon and hydrogen or is substituted-hydrocarbon containing additional atoms such as halogen or divalent oxygen. Such bidentate ligands of sulfur are illustrated by 1,2-di(ethylthio)ethane, 1,3-di(benzothio)propane and 1,2-di(phenylthio)ethane. In the case of the bidentate ligands of sulfur, the preferred R' groups are aliphatic and hydrocarbon and particularly preferred as the bidentate sulfur ligand is 1,2-di(ethylthio)ethane.

In the instances where the bidentate ligand employed in formation of the catalyst composition is a bidentate ligand of nitrogen, the ligand is preferably of the formula

(III)

wherein X independently is a divalent bridging group of up to 10 carbon atoms with from 3 to 4 atoms in the bridge, at least two of which are carbon atoms and any additional atoms are nitrogen atoms. Illustrative of such bidentate nitrogen ligands are 2,2'-bipyridine and 1,10-phenanthroline.

The preferred bidentate ligands for use in the formation of the catalyst composition, however, are bidentate ligands of phosphorus of the general formula

(IV)

wherein R' and R have the previously stated meanings. In the case of the bidentate phosphorus ligands, the preferred R' groups are aromatic and are hydrocarbon phenyl or are substituted phenyl with a polar group, preferably alkoxy, as a substituent on at least one aromatic ring carbon atom located ortho to the carbon atom through which the aromatic ring is attached to the phosphorus. Illustrative of phosphorus groups containing such preferred R' groups are 1,3-bis(diphenylphosphino)propane and 1,3-bis[di(2-methoxyphenyl)phosphino]propane, of which the latter ligand is particularly preferred.

When a bidentate ligand of sulfur or nitrogen is employed, suitable quantities of ligand are from about 0.5 mole to about 100 moles per mole of palladium, preferably from about 1 mole to about 50 moles of ligand per mole of palladium. When a bidentate ligand of phosphorus is utilized, a suitable quantity of ligand is from about 0.5 mole to about 2 moles per mole of palladium. Preferred quantities of bidentate phosphorus ligand are from about 0.75 mole to about 1.5 mole per mole of palladium.

The carbon monoxide and hydrocarbon are contacted under polymerization conditions in the presence of the catalyst composition and a reaction diluent. Molar ratios of total ethylenically unsaturated hydrocarbon to carbon monoxide from about 10:1 to about 1:5 are satisfactory with molar ratios from about 5:1 to about 1:2 being preferred. The catalyst composition is employed in a catalytic amount. Sufficient catalyst composition is used to provide from about $1 \times 10^7$ mole to about $1 \times 10^{-3}$ mole of palladium per mole of ethylenically unsaturated hydrocarbon. Preferred quantities of catalyst composition provide from about $1 \times 10^{-6}$ mole to about $1 \times 10^{-4}$ mole of palladium per mole of ethylenically unsaturated hydrocarbon. The reaction diluent is a material in which the reaction mixture components are soluble but in which the polymeric product is substantially insoluble. Illustrative of such diluents are the lower alkanols such as ethanol and methanol and the lower alkanones such as acetone or methyl ethyl ketone. Methanol is preferred as the reaction diluent. The contacting of the monomeric reactants takes place in a suitable reactor and is facilitated by conventional procedures such as shaking or stirring.

The typical polymerization conditions include a temperature from about 25° C. to about 150° C. but preferably from about 30° C. to about 130° C. The polymerization is conducted at a pressure from about 2 bar to about 150 bar with polymerization pressures from about 5 bar to about 100 bar being more commonly employed.

In the process of the invention, an initial polymerization is conducted at a first polymerization temperature to produce an initial polymer or prepolymer. The continuing polymerization is conducted at a second polymerization temperature from about 3° C. to about 30° C., preferably from about 5° C. to about 20° C., lower than the first polymerization temperature. The polymerization pressure of the continuing polymerization is the same as or is different from the pressure of the first polymerization but the pressures of the two polymerization steps are preferably substantially the same. By this technique, the initial polymerization produces a prepolymer which is present during the continuing polymerization step. Preferably the prepolymer is produced in sufficient quantity to constitute from about 4% by weight to about 30% by weight of the mixture employed in the continuing polymerization. The precise procedure by which the prepolymer is produced and provided to the mixture undergoing the continuing polymerization step is not critical. In one modification, the two sequential polymerization steps take place in a single reactor. The monomeric reactants, the catalyst composition and the reaction diluent are introduced to the reactor and polymerization is effected at a given temperature and pressure. When prepolymer has been produced, the reaction temperature is lowered and additional monomeric reactants are introduced while polymerization continues at the lower temperature in the presence of the prepolymer initially formed at the higher temperature. In a second modification, the polymerization takes place in two or even more reactors connected in series. Monomeric feed, catalyst composition and diluent are charged to the first reactor where polymerization takes place to produce the prepolymer. The product mixture from the first reactor is passed to the second or a subsequent reactor where any necessary makeup feed is introduced and polymerization continues in the second or subsequent reactor which operates at a temperature lower than that of the first reactor. In either modification, the pressure of the polymerization is suitably controlled as by introducing, continuously or intermittently, feed gas or by venting unreacted feed gas if a pressure reduction is desired. The polyketone product is obtained as a material substantially insoluble in the reaction diluent and is recovered from the diluent by well known methods such as filtration or decantation. The polyketone is used as recovered or is purified as by contacting the polymer with a solvent or complexing agent selective for catalyst residues.

The process of the invention, in contrast to the more conventional processes, results in an increased polymerization rate while producing polymer product having an increased average molecular weight. The molecular weight of the polyketone, as a relative matter, is easily determined by measuring the limiting viscosity number of the polymer product, most conventionally in m-cresol at 60° C. As compared with conventional one-temperature polymerizations, the product of the invention is produced in greater quantity per unit of catalyst per unit time, and yet the polyketone polymer will have a higher limiting viscosity number which evidences a higher molecular weight. A somewhat similar two-temperature process is described in copending U.S. patent application Ser. No. 529,305, filed May 29, 1990. In this process all the examples show the use of a second polymerization temperature higher than the first polymerization temperature and the objective is to obtain a polyketone polymer of relatively wide molecular weight distribution.

The polyketone polymer obtained by the process of the invention is a thermoplastic polymer and enjoys the applications which are conventional for thermoplastic polymers. The polyketone is processed by conventional processing techniques such as extrusion, injection molding or thermoforming into a variety of shaped articles. Specific applications include the production of containers for food and drink and parts and housings for the automotive industry.

The invention is further illustrated by the following Comparative Examples (not of the invention) and the Illustrative Embodiments which should not be construed as limiting. In each case the terpolymer product was examined by $^{13}$C-NMR analysis and found to be linear and consist of units derived from carbon monoxide alternating with units derived from ethylene or propylene, which latter units occurred randomly throughout the polymer.

COMPARATIVE EXAMPLE I

A terpolymer of carbon monoxide, ethylene and propylene was produced by charging 1.5 liter of methanol to a 4 liter autoclave equipped with a mechanical stirrer. The autoclave and contents were heated to 89° C. and sufficient propylene was added to give a pressure of 10 bar. This was followed by sufficient carbon monoxide to give a total pressure of 28 bar and ethylene to give a total pressure of 50 bar. A catalyst composition solution was then added which comprised 1 ml of acetone, 0.02 mmol palladium acetate, 0.4 mmol trifluoroacetic acid and 0.021 mmol 1,3-bis-[di(2-methoxyphenyl)phosphino]propane. The pressure in the autoclave was maintained by the addition of an equimolar mixture of carbon monoxide and ethylene. After 7 hours, the polymerization was terminated by cooling the autoclave and contents to room temperature and releasing the pressure. The terpolymer product was recovered from the product mixture by filtration, washed with methanol and dried. The yield of terpolymer was 225 g, produced at a polymerization rate of 15.2 kg of terpolymer/g Pd hr. The product had a limiting viscosity number of 1.0 dl/g, measured at 60° C. in m-cresol.

COMPARATIVE EXAMPLE II

A terpolymer of carbon monoxide, ethylene and propylene was produced by a procedure substantially similar to that of Comparative Example I except that the reaction temperature was 81° C. A total of 129 g of terpolymer was produced at a polymerization rate of 8.7 kg of terpolymer/g Pd hr. The terpolymer had a limiting viscosity number, measured at 60° C. in m-cresol, of 1.8 dl/g.

Illustrative Embodiment I

A terpolymer of carbon monoxide, ethylene and propylene was produced by a procedure substantially similar to that of Comparative Example I except that the polymerization was conducted at 89° C. for 30 minutes and the reaction mixture was then cooled over 5 minutes to 81° C. at which temperature the reaction continued for an additional 6 hours and 25 minutes. The overall yield of terpolymer was 194 g, produced at a calculated rate of 13.1 kg of terpolymer/g Pd hr. The terpolymer product had a limiting viscosity number of 2.1 dl/g. Within the first 30 minutes of polymerization, 15.5 g of terpolymer had been produced.

COMPARATIVE EXAMPLE III

Illustrative Embodiment II

In these two experiments, carbon monoxide/ethylene/propylene terpolymers were produced by a continuous method in two series-connected reactors wherein the reaction product from the first reactor was passed, together with fresh feed, into the second reactor. The catalyst composition solution in each case comprised 1096 mg palladium acetate, 2736 mg 1,3-bis[di(2-methoxyphenyl)phosphino]propane and 5600 mg trifluoroacetic acid per liter of acetone. In both experiments the pressure in each reactor was maintained at 45 bar. The pressure was maintained by discharging excess feed gas from the second reactor so that both reactors had substantially the same gas composition. The reaction conditions in the two reactors and the results of each experiment are provided in the Table.

TABLE

| Experiment | Comparative Example III | Comparative Example II |
|---|---|---|
| First reactor | | |
| Reactor volume, liters | 13.6 | 13.6 |
| Feed rates | | |
| methanol, kg/h | 5.75 | 5.75 |
| carbon monoxide, Nl/h | 170 | 210 |
| ethene, Nl/h | 410 | 400 |
| propene, kg/h | 0.57 | 0.50 |
| catalyst solution, ml/h | 22 | 22 |
| Temperature, °C. | 77 | 90 |
| Quantity by weight of suspension in reactor, kg | 7.3 | 7.3 |
| Palladium concentration in reactor, mg/kg methanol | 2.0 | 2.0 |
| Suspension concentration, % w | 1.4 | 2.8 |
| Quantity of polymer produced, g/h | 90 | 180 |
| Polymerization rate, kg polymer/g palladium hr | 7.1 | 14.3 |
| Second reactor | | |
| Reactor volume, liters | 150 | 150 |
| Feed rates | | |
| carbon monoxide, Nl/h | 330 | 425 |
| ethene, Nl/h | 370 | 505 |
| propene, kg/h | 0.07 | 0.11 |
| Temperature, °C. | 77 | 77 |
| Quantity by weight of suspension in reactor, kg | 83 | 83 |
| Palladium concentration in reactor, mg/kg methanol | 2.0 | 2.0 |
| Suspension concentration, % w | 13.0 | 16.6 |
| Quantity of polymer produced, g/h | 880 | 1200 |
| Polymerization rate, kg polymer/g palladium hr | 6.9 | 9.2 |
| LVN of end product, dl/g, m-cresol at 60° C. | 1.8 | 2.2 |

What is claimed is:

1. In the process of producing a linear alternating polymer of carbon monoxide and at least one ethylenically unsaturated hydrocarbon by contacting the carbon monoxide and hydrocarbon under polymerization conditions in the presence of a reaction diluent and a catalyst composition formed from a palladium compound, the anion of a strong non-hydrohalogenic acid and a bidentate ligand of phosphorus, nitrogen or sulfur, the improvement wherein an initial polymerization to produce prepolymer is followed by polymerization at a polymerization temperature from about 3° C. to about 30° C. lower than the polymerization temperature of the initial polymerization, and in the presence of a substantial amount of the prepolymer.

2. The process of claim 1 wherein the initially produced prepolymer constitutes from about 4% by weight to about 30% by weight of the polymerization mixture of the continuing polymerization.

3. In the process of producing a linear alternating terpolymer of carbon monoxide, ethylene and propylene by contacting the carbon monoxide, ethylene and propylene under polymerization conditions in the presence of reaction diluent and a catalyst composition formed from a palladium alkanoate, the anion of a non-hydrohalogenic acid having a pKa below 2 and a bidentate ligand of phosphorus, the improvement of conducting an initial polymerization to produce a prepolymer and continuing the polymerization at a polymerization temperature from about 3° C. to about 30° C. lower than that of the initial polymerization and in the presence of a substantial amount of prepolymer in the continuing polymerization mixture.

4. The process of claim 3 wherein the initially produced prepolymer constitutes from about 4% by weight to about 30% by weight of the polymerization mixture of the continuing polymerization.

5. The process of claim 4 wherein the polymerization is continued at a temperature from about 5° C. to about 20° C. lower than the polymerization temperature of the initial polymerization.

6. A process for preparing a linear alternating polymer of carbon monoxide and at least one ethylenically unsaturated hydrocarbon in the presence of a reaction diluent and a catalyst composition formed from a palladium compound, the anion of a strong non-hydrohalogenic acid and a bidentated ligand of phosphorus, nitrogen, or sulfur, comprising:

contacting the carbon monoxide and at least one ethylenically unsaturated hydrocarbon under polymerization conditions at a first polymerization temperature, to form a prepolymer; and subsequently contacting the carbon monoxide and at least one ethylenically unsaturated hydrocarbon under polymerization conditions at a second polymerization temperature, and in the presence of a substantial amount of the prepolymer, wherein the second polymerization temperature is from about 3° C. to about 30° C. lower than the first polymerization temperature.

7. The process of claim 6 wherein the two sequential polymerization steps take place in a single reactor.

8. The process of claim 6 wherein the two sequential polymerization steps take place in two or more reactors connected in series.

9. The process of claim 6 wherein the second polymerization temperature is from about 5° C. to about 20° C. lower than the first polymerization temperature.

10. The process of claim 6 wherein the prepolymer constitutes from about 4% by weight to about 30% by weight of the polymer mixture of the subsequent polymerization.

* * * * *